United States Patent [19]
Schell et al.

[11] Patent Number: 5,313,332
[45] Date of Patent: May 17, 1994

[54] FLEXURE SUSPENSION FOR TWO AXIS ACTUATOR

[75] Inventors: David L. Schell, Colorado Springs; Leonardus J. Grassens, Monument; Kurt W. Getreuer, Colorado Springs, all of Colo.

[73] Assignee: Applied Magnetics Corporation, Goleta, Calif.

[21] Appl. No.: 98,212

[22] Filed: Jul. 26, 1993

Related U.S. Application Data

[63] Continuation of Ser. No. 614,831, Nov. 16, 1990, abandoned.

[51] Int. Cl.$^5$ .............................................. G11B 7/00
[52] U.S. Cl. .................................. 359/813; 369/44.15; 369/44.16
[58] Field of Search ............... 369/44.16, 44.15, 44.14, 369/44.17, 44.18, 44.19, 44.21, 44.22, 244, 247, 256; 359/813, 814, 823, 824

[56] References Cited

U.S. PATENT DOCUMENTS

| | | |
|---|---|---|
| 3,310,792 | 3/1967 | Groom et al. |
| 3,931,641 | 1/1976 | Watrous ............................ 360/104 |
| 4,449,213 | 5/1984 | Noborimoto et al. ............... 369/45 |
| 4,504,935 | 3/1985 | Jansen ................................ 369/32 |
| 4,514,837 | 4/1985 | Van Rosmalen .................... 369/219 |
| 4,542,429 | 9/1985 | Nishida et al. ...................... 360/103 |

(List continued on next page.)

FOREIGN PATENT DOCUMENTS

| | | |
|---|---|---|
| 57-18037 | 1/1982 | Japan. |
| 57-48709 | 3/1982 | Japan. |
| 58-64649 | 4/1983 | Japan. |
| 60-1150031 | 6/1985 | Japan. |
| 60-129937 | 7/1985 | Japan. |
| 60-247854 | 12/1985 | Japan. |
| 61-17230 | 8/1986 | Japan. |
| 61-182642 | 8/1986 | Japan. |
| 61-248241 | 11/1986 | Japan. |
| 01037733 | 2/1989 | Japan .............................. 369/44.16 |

OTHER PUBLICATIONS

Equichi, Naoya, et al., "An 86 mm magneto-optical disk drive with a compact and fast-seek-time optical head," Optical Data Storage Conference, Vancouver, Mar. 1990.

(List continued on next page.)

*Primary Examiner*—Aristotelis Psitos
*Assistant Examiner*—P. W. Huber
*Attorney, Agent, or Firm*—Knobbe, Martens, Olson & Bear

[57] ABSTRACT

A device for reading information from or writing information to an optical disc memory system using light from a laser diode includes an upper and lower flexure suspension. Both flexure suspensions are mounted on both an objective lens holder and its base. Each of these flexures is U-shaped and the central part of each leg of the U is a stiff beam. At each end of the control beam is provided a tracking hinge. Outward from the tracking hinges are a pair of focusing hinges which are separated from the tracking hinges by means of spacing beam sections. The unique configuration of the system allows these parallel mounted flexures to move in only two rigid modes namely, displacement along the x-axis (tracking) and displacement along the z-axis (focusing). These two rigid modes allow the objective lens to be re-positioned so that light beams may strike the information medium correctly. The sturdiness of these beam section therefore constrains the four remaining degrees of freedom so that displacement in the y direction, namely tangential motion and rotation in the x, y and z directions, specifically roll, pitch and yaw are severely limited thus essentially eliminated. This feature is paramount in that the possibilities . for undesired skewing of the flexure and the attached objective lens are precluded.

19 Claims, 7 Drawing Sheets

U.S. PATENT DOCUMENTS

| | | | |
|---|---|---|---|
| 4,568,142 | 2/1986 | Iguma | 350/6.3 |
| 4,571,026 | 2/1986 | Maruta | 350/247 |
| 4,596,444 | 6/1986 | Ushida | 350/247 |
| 4,596,448 | 6/1986 | Kikuchi | 350/247 |
| 4,644,516 | 2/1987 | Musha | 369/43 |
| 4,646,283 | 2/1987 | Ito et al. | 369/256 |
| 4,669,073 | 5/1987 | Wakabayashi et al. | 369/111 |
| 4,740,946 | 4/1988 | Yumura et al. | 369/219 |
| 4,763,314 | 8/1988 | McCaslin et al. | 369/43 |
| 4,786,999 | 11/1988 | Tanaka et al. | 360/104 |
| 4,792,875 | 12/1988 | Ohdaira | 360/104 |
| 4,794,586 | 12/1988 | Korth | 369/215 |
| 4,797,763 | 1/1989 | Levy et al. | 360/104 |
| 4,823,336 | 4/1989 | Inada et al. | 369/215 |
| 4,829,395 | 5/1989 | Coon et al. | 360/104 |
| 4,853,811 | 8/1989 | Brooks et al. | |
| 4,868,694 | 9/1989 | Hagen | 360/104 |
| 4,882,644 | 11/1989 | Kimura et al. | 360/104 |
| 4,912,583 | 3/1990 | Hinlein | 360/104 |
| 4,922,477 | 5/1990 | Miura | 369/221 |
| 5,124,965 | 6/1992 | Mizuno et al. | 369/44.14 |

OTHER PUBLICATIONS

Hitatchi, Prototype Specification Sheet for a magneto-optical disk drive.

Yoshizumi, Keiichi, et al., "Fast Access Actuator for Optical Disk Memory", SPIE, 1985.

Nissho Electronics Corporation, Product Brochure, NE-5001 Half Height Optical Disk Drive, COMDEX, Nov. 1989.

Magnetic Head-Lines, Applied Magnetics Corp. Newsletter, Nov. 1990, pp. 6-7.

Sony, Product Brochure, SMO-501 Optical Disk Drive.

Technical Report No. 9-15, UCLA School of Engineering and Applied Science, "Dynamics and Design of Read/Write Head Suspensions for High Performance Small Form Factor Rigid Disk Drive," D. Miu and R. Karam, Oct. 1990.

IEEE Transactions on Magnetics, vol. 26, No. 5, Sep. 1990, "A Design of High Performance in Line Head Assembly for High-Speed Access," T. Ohwe, et al.

Fig. 6a — FOCUS

Fig. 6b — TRACKING

Fig. 6c — PITCH

Fig. 6d — ROLL

Fig. 6e — TANGENTIAL

Fig. 6f — YAW

FLEXURE SUSPENSION FOR TWO AXIS ACTUATOR

This application is a continuation of application Ser. No. 07/614,831, filed Nov. 16, 1990, now abandoned.

BACKGROUND OF THE INVENTION

1. Field of the Invention

The present invention relates to support and positioning devices, called flexure suspensions, used in two axis actuators for optical recording heads.

2. Description of the Related Art

The present invention relates, in general, to optical reading devices used in optical disc storage systems. Information is stored in these devices in tracks on an information medium such as a disc. When information is read from the information medium, no physical contact exists between the information medium and the read head. Instead, information is transmitted by light whose source is generally a laser diode. This information can be supplied by a writing beam to affect a change in the information medium or can be supplied by a reading beam to detect data encoded on the information medium.

In optical disc memory systems, information may be written in a variety of ways. For example, data can be stored on the information carrier in the form of marks. This information medium is commonly referred to as a write once non-erasable medium since the marks are typically unalterable once formed and recorded by a melting process. These marks are small depressions which provide variation to the smooth blank surface of the disc. These small depressions alter the surface of the disc so that, when a reflected light beam is converted to an electrical signal by means of an optical pick-up, the electrical signal can be used to distinguish the smooth disc surface from the depressions.

Another method for writing data is magneto-optical recording. According to this method, a heat source such as a laser increases the temperature of the recording medium beyond a threshold temperature known as the Curie Point or the Curie Temperature. Above this temperature, ferromagnetic materials lose their magnetic properties including magnetization and polarization. Upon cooling, the random magnetic field at a specified data spot on the disc may be set to a definite direction by an external magnetic field. Data is stored at a precise location on the information storage medium by simultaneously generating the required external field while heating that location with a laser and then allowing the location to cool. Because the polarization of the material affects its optical characteristics, the data can be read by a reflected laser beam in much the same manner as discussed above. This data remains encoded on the information medium until a heat source generates a temperature above the Curie Temperature erasing the information.

In optical disc memory systems, reading and writing are often achieved using a single laser source functioning at two respective intensities. During either operations, light from the laser source passes through an objective lens which converges the light beam to a specific focal point on the information carrier. The objective lens is moveable in a first, "focus" (up-and-down) direction in order to "focus" the laser beam to a small selected spot of light on the information medium (e.g., a disc) to write or retrieve information, and in a second, "tracking" (side-to-side) direction, to position the beam over the exact center of a read/write track. During a write operation, light from a laser is focused on a spot to raise the temperature of the spot, and to thereby permit the spot to cool in an imposed magnetic field. During data retrieval, laser light is focused on the recording medium and is altered by the information of the data storage medium. This light is reflected off the disc, back through the objective lens, to a photodetector. It is therefore this reflected signal that transmits the recorded information. It is especially important that, when information is being written to or read from the memory, the objective lens, and the exiting focused beam, be precisely focused at the center of the correct track so that the information may be accurately written and retrieved.

In these systems, the position of the objective lens in the focus and tracking directions is adjusted by a pair of control systems. Actuators which support the objective lens convert position correction signals from the feedback control systems into movement of the objective lens. This feedback control is imperative since, without it, a light beam may not converge at a precise desired location on the information medium.

Efforts to miniaturize these read/write or read only systems and to store as much information as possible on a given information medium have been limited by the difficulties of precisely controlling the focus and tracking of the laser light. As will be appreciated, failure to focus the light on a small enough area of the medium will result in too large a portion of the medium being used to store a given amount of information, or in too broad of an area of the medium being "read." Likewise, the failure to precisely control the "tracking" of the laser light will result in the information being stored in the wrong location or in information from the wrong location being read. In particular, it is extremely difficult to permit the precisely controlled movement of the objective lens needed for the focusing and tracking of the laser light while preventing movement of the objective lens in other directions which distort the desired movement patterns of the objective lens.

SUMMARY OF THE INVENTION

The present invention is an improved apparatus for reading information from an optical disc memory system. In particular, the present invention concerns a support system for a two axis actuator which permits controlled movement of the objective lens so that both focusing and tracking movement are accommodated, while movement in any other direction is restricted.

Desirably, a pair of flexures of identical configuration is used to movably mount a holder which is suspended within a base support. The flexures desirably include an aperture for passing light from the objective lens to the information medium and vice versa. A first flexure is affixed to the top of the objective lens holder so that the aperture of the flexure is directly aligned with a corresponding aperture in the lens holder. A second flexure extends parallel to the first flexure, but is attached to the bottom side of the lens holder. The apertures of the flexures and the aperture of the lens holder are all aligned with the axis of the objective lens.

The first flexure is attached by two flexible arms to a rigid base. Hinges are provided on the arms of this first flexure in spaced locations along each arm to permit precisely controlled focus and tracking movement. The second flexure is likewise connected to the rigid base by a pair of hinged arms, but at a location of set from the first flexure.

These parallel flexures cooperate to provide focus and tracking motion of the lens while constraining the four remaining degrees of freedom. That is, these flexures are designed so that displacement in the disc tangential direction, and rotation in all directions; namely, roll, pitch and yaw, are severely limited.

Each of the two arms supporting each of the upper and lower flexures has three beam sections in the region between the lens holder and the base. For purposes of this application, a "beam section" is a section of the flexure which is reinforced against bending. These beam sections are desirably formed by bending the flexure arm to form a relatively stiff beam. Alternatively, the beam sections may be stiffened in another manner such as by laminating reinforcing material along the length of the beam section. At each end of the control beam portion, a tracking hinge is formed as a flat length of the flexure arm lying in a plane which is parallel to the axis of the objective lens. A pair of outboard beam sections are formed on each flexure arm outboard of the tracking hinges. These outboard beam sections separate the tracking hinges from a pair of focus hinges which lie between the outboard beam sections and the support base or lens holder. These focus hinges are formed as a flat length of flexure material lying in a plane which is perpendicular to the axis of the objective lens. The flexibility of the inner and outer hinge pairs can be tuned independently in order to achieve the most opportune stiffness. The three beam sections provide the stiffness to impede unwanted motion of the lens.

DETAILED DESCRIPTION OF THE PREFERRED EMBODIMENT

Figure 1:
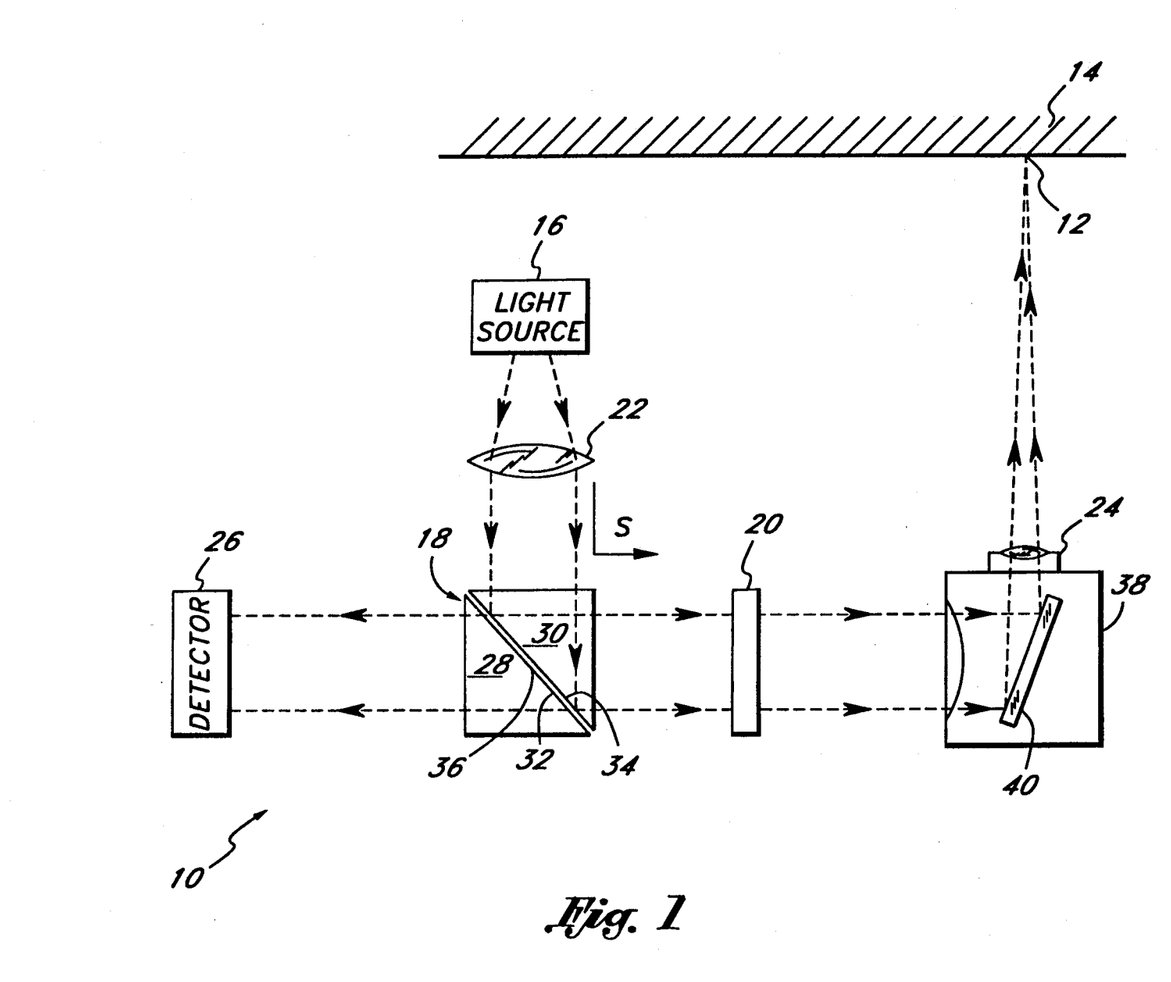
FIG. 1 is a schematic illustration of an optical disc read/write system.

FIG. 1 schematically illustrates the operation of an exemplary optical read/write system 10 in reading data from a precise location 12 on an information storage medium 14. Information is transmitted to and from the information medium 14 without the need of physical contact between the information medium 14 and the read head. Rather, information is transmitted by light through a plurality of components of the read/write system 10. These components comprise a cube-shaped beamsplitter 18, which separates light beams according to their polarization, a quarter wave plate 20 which changes the polarization of a light beam, a collimator lens 22 and an objective lens 24 which, in combination, direct the light beam toward the location 12 on the information medium 14.

After this light beam is altered by the data encoded on the information medium 14, the returning data-carrying light beam is received by a detector element 26 which converts this optical signal into an electrical signal.

A light source element 16, typically a laser diode, emits light toward the convex collimator lens 22. The collimator lens 22 converts this source beam into a parallel, linearly S polarized light beam and conducts it toward the beamsplitter 18. This cube-shaped beamsplitter 18 is formed by attaching two right angle prisms 28 and 30 along their respective diagonals 32 and 34 and includes a polarization sensitive coating 36 referred to as a splitting interface along this internal diagonal. This polarization sensitive beamsplitter 18 separates and/or combines light beams of differing polarization states, namely linear S polarization and linear P polarization. Separation is accomplished in conjunction with the polarization sensitive coating 36 since this semipermeable coating 36 selectively transmits the light beams if the light beams are linearly P polarized or reflects light beams if the light beams are linearly S polarized. Light exiting the beamsplitter 18 passes through a quarter wave plate 20 which functions to convert the linearly polarized light bean to a circularly polarized light bean. Upon exiting the quarter wave plate 20, the circularly polarized beam enters an actuator 38.

The actuator 38 includes a mirror 40 which orthogonally reflects the light beam upward toward the objective lens 24. This objective lens 24 converges the circularly polarized beam to a precise focal point 12 on the information medium 14.

Upon striking the data-storage medium 14, the circularly polarized light beam is altered by the information stored on the medium 14 and is reflected as a divergent circularly polarized light beam carrying information identical to that encoded on the information medium 14. This reflected circularly polarized light beam re-enters the objective lens 24 where it is collimated. The light is again reflected from the mirror 40 and re-enters the quarter wave plate 20. Upon exiting the quarter wave plate 20, the circularly polarized beam is converted to a linearly P polarized light beam. As linearly P polarized light beams are transmitted through the beamsplitter 18 without reflection at the splitting interface 36, the light continues to a photodetector 26. According to the writeonce, non-erasable method, data is stored at a precise location 12 on the information medium 14 in the form of pits and is detected by the photodetector 26 according to the intensity of the returning light beam which is altered by these pits. In addition, if the light falling on the photodetector 26 is out of focus or misaligned, the amount of misalignment or defocusing is measured electronically, and is used as the feedback for a servo system which properly realigns the objective lens 24 to keep the beam properly aligned and focused.

Figure 2:
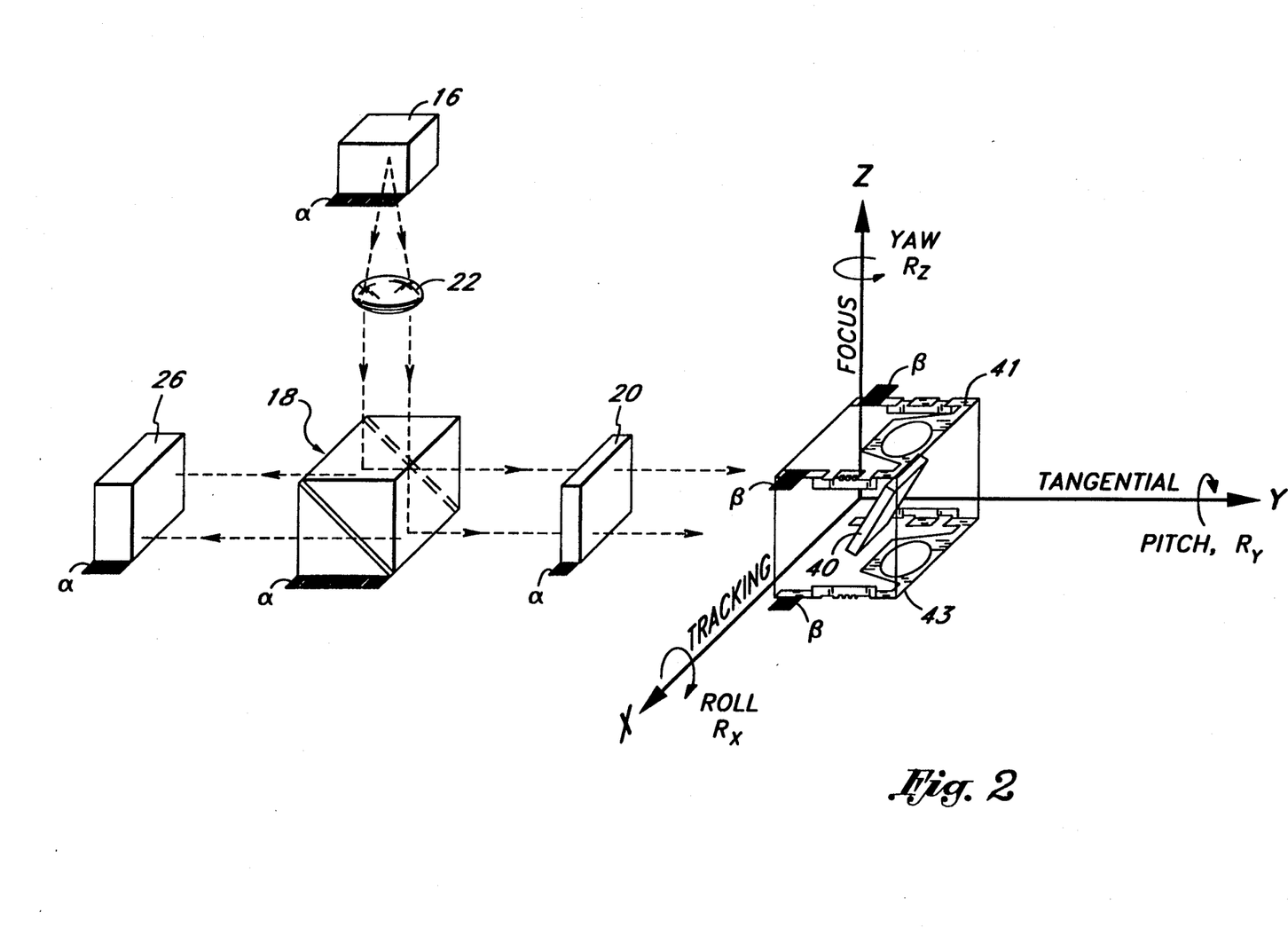
FIG. 2 is a schematic illustration of an optical disc read/write system including the support system of this invention, showing the orthogonal movement modes.

This alignment implementation can be understood from the schematic illustration of FIG. 2, which shows the elements of FIG. 1 three-dimensionally, as well as the mounting arrangement for these elements. As shown by the gantry foundational connections $a$, most of the elements of the read/write system 10 are rigidly mounted to a portion of the data storage system. Specifically, these elements, namely the beamsplitter 18, light source 16, lens 22 and quarter wave plate 20, are typically mounted on a gantry (not shown) which moves relative to the information medium 14 to permit reading or writing on selected tracks (usually circular tracks on a disc-shaped information medium). A positioning system is used to rapidly move the gantry over a selected track and to roughly align the objective lens 24 over the center of that track.

In this preferred embodiment, the flexures 41, 43 of the present invention are of an identical configuration, differing only in their orientation. The flexures 41, 43 suspend the actuator 38 from the rigid base connections, as shown by the representations $\beta$. The flexures 41, 43 are flexible to provide limited movement for the actuator 38, which they support. More specifically, the flexures 41, 43 are arranged and designed to permit controlled motion in the focus direction, shown as translation along the Z axis in FIG. 2, to precisely focus the light beam at the desired location 12 (FIG. 1) on the surface of the information medium. The Z axis is perpendicular to the idealized surface of the information medium. The weight and configuration of the actuator 38 and flexures 41, 43 are selected so that the servo system (not shown) can move the actuator 38 in the focus direction very rapidly to maintain proper focus even if the disc 14 undulates during rotation.

The flexures 41, 43 permit controlled motion in a second direction, shown as translation along the X axis in FIG. 2. This X direction is the same direction in which the gantry (not shown) moves the read/write system 10 and is perpendicular to the Z axis. The coordinate system is completed by a Y axis which is perpendicular to both the X and Z axes. The flexure-controlled motion is used for precise positioning of the actuator 38 after the gross positioning over the proper track has been accomplished.

There are four additional motion modes for the actuator 38, each of which is undesirable during normal operation of the system since each will reduce the accuracy of the reading or writing operation of the system. These modes are shown as pitch $R_y$ (rotation about the Y axis), yaw $R_z$ (rotation about the Z axis), roll $R_x$ (rotation about the X axis) and tangential translation (linear motion along the Y axis). The flexures 41, 43 are designed to prohibit, to the greatest possible extent, motion in each of these modes, while permitting controlled motion in the focus (linear Z) and tracking (linear X) directions.

Figure 3:
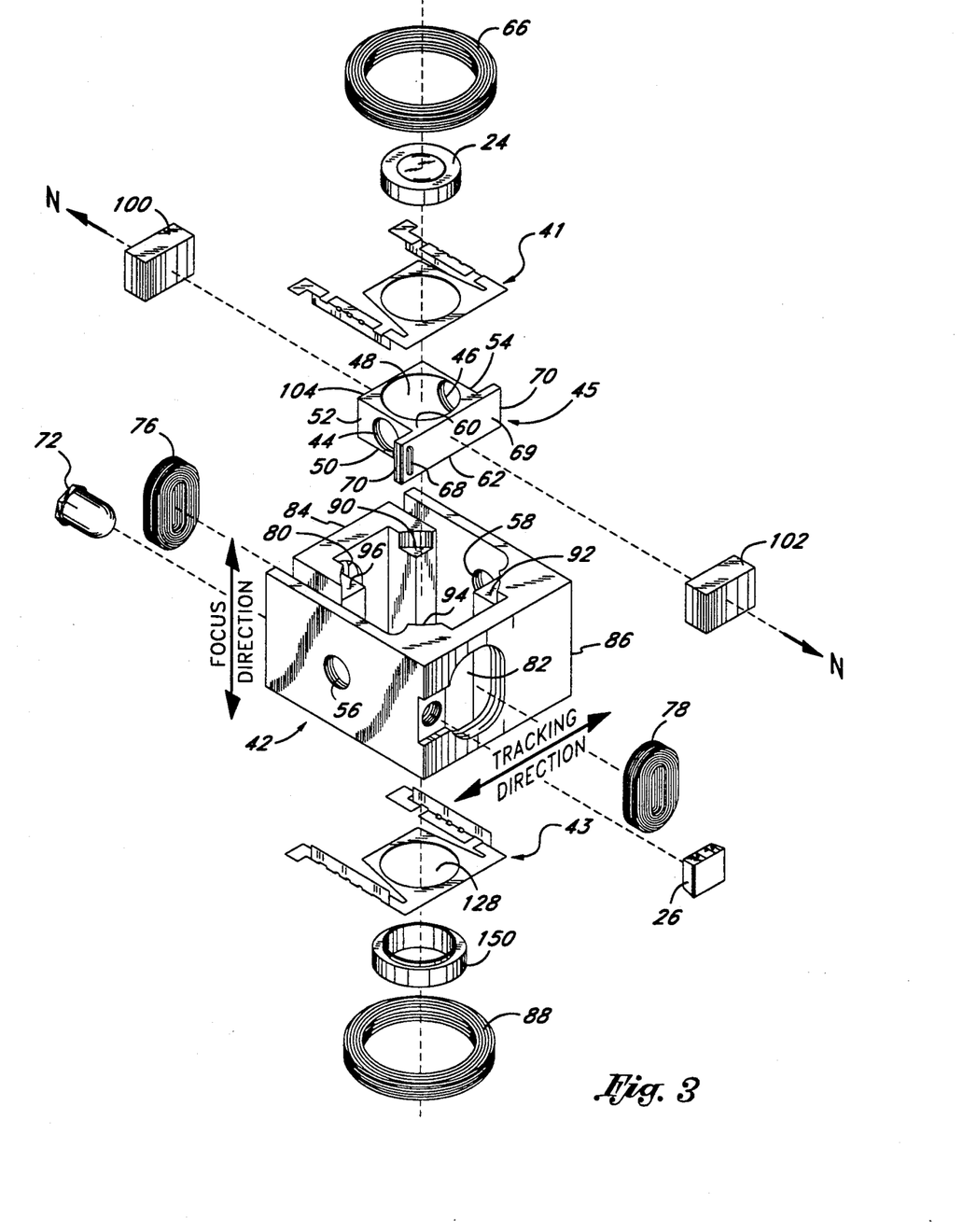
FIG. 3 is an exploded perspective view of a preferred embodiment of an objective lens and accompanying support system.
Figure 4:
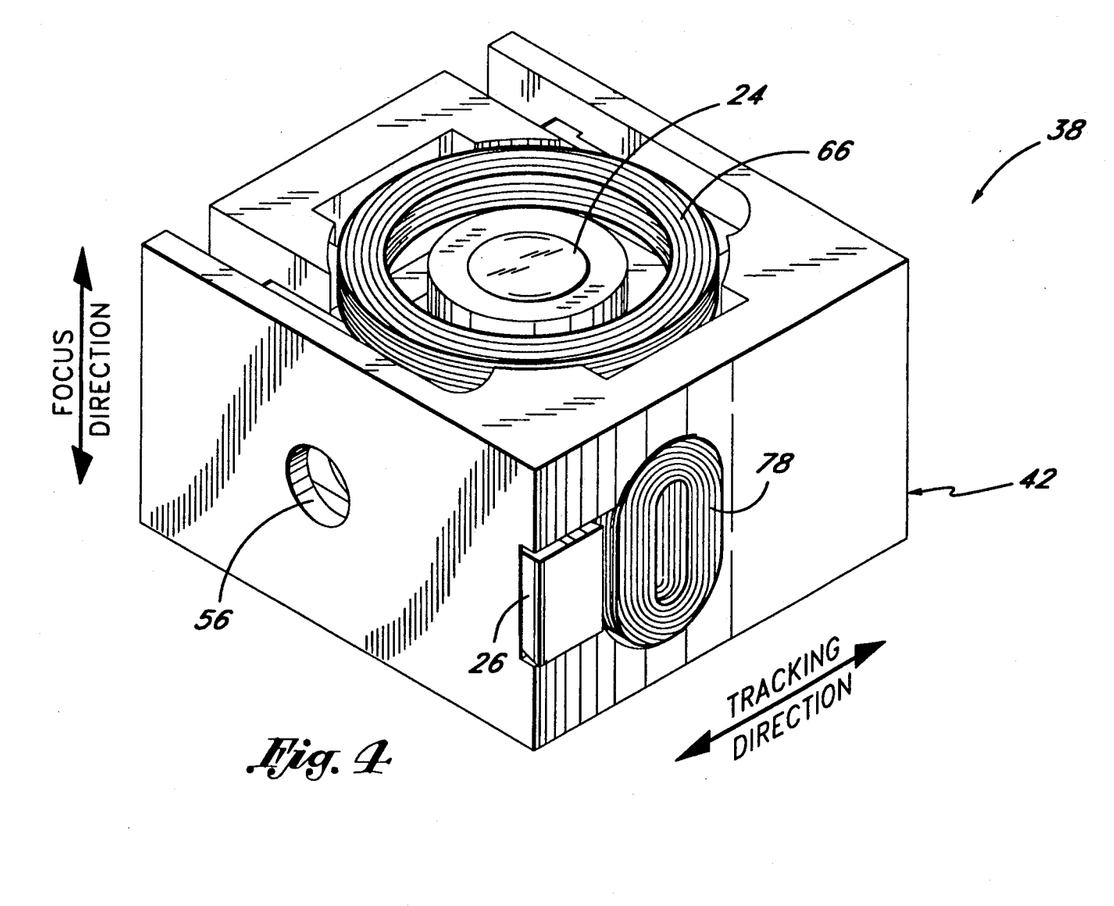
FIG. 4 is a perspective view of system of FIG. 3.

In order to better understand the function of the flexures 41, 43, a detailed understanding of the structure of the actuator 38 can be gained through reference to FIGS. 3 and 4. As shown in those figures, an objective lens holder 45 is surrounded by a stationary cube-shaped base 42. This base 42 includes an essentially hollow interior with the exception of two elements, namely, the objective lens holder 45 and a tilted mirror 40 (not visible in FIG. 3) which is used (as before mentioned) to orthogonally reflect light beams to and from an information medium 14.

The objective lens holder 45 has the general shape of a short rectangular box. The holder includes a pair of opposing rectangular vertical sides 52 and 54, a pair of opposing rectangular vertical ends 69, 104, a generally square top 60 and a generally square bottom 62. One of the ends 69 includes a pair of outwardly extending flanges 70, the purpose of which will be discussed below. The sides 52, 54 each form an opposing circular aperture 44 and 46, respectively, through which light is able to pass. The sides of the base 42 likewise form apertures 56 and 58, which are aligned with the apertures 44 and 46, in the sides of the lens holder 45. Likewise, the top 60 and the bottom 62 of the holder each form a larger opposing aperture 48 and 50, respectively, through which light may pass. It should be understood that in the described embodiment light only passes through a single set of the apertures, rather than, for example, through both the apertures 48 and 50.

In a similar manner, these apertures 48 and 50 function to allow the passage of the source light beam through the lens holder 45 with minimal interference. An incoming light bean enters the apertures 44 or 46 in the sides of the holder and is orthogonally reflected upward by a tilted mirror 40. Beams of light continue along this vertically directed path and pass through the objective lens 24 toward the information medium 14.

An opening 68 in one of the flanges 70 of the objective lens holder 45 functions to assist in repositioning the objective lens 24. The opening is used for detecting movement of the objective lens holder 45 with respect to the base 42 in both the focus (up-and-down) and tracking (side-to-side) directions. According to this position detection system, an LED 72 emits substantially collimated light which passes partially or completely through the opening 68 depending on the relative positioning between the LED 72 and the opening 68. This light beam is typically received by a quad diode 26 which detects the position of the lens holder 45 according to the light striking each of its quadrants. Knowledge of this position serves as an initial reference from which further repositioning of the objective lens 24 may be based.

A pair of annular oval shaped tracking coils 76 and 78 are inserted into oval apertures 80 and 82 found on laterally opposed ends 84 and 86 of the base 42 while a pair of ring shaped focusing coils 66 and 88 are provided above and below the lens holder 45 and are secured to the base 42. For example, the upper focus coil 66 may be supported by the base 42 by four ledges 90, 92, 94 and 96 slightly inset from the top of the base 42.

These coils 66, 88, 76 and 78 along with two permanent magnets 102 and 100 secured to the ends 69 and 104, respectively, of the lens holder 45 assist in realigning the objective lens holder 45 when either a control feedback focus error signal or a control feedback tracking error signal is obtained. This error signal is used as the input to a respective tracking servo circuit (not shown) or a focusing servo circuit (not shown) whereby servo circuits provide a driving signal which is applied to respective tracking 76 and 78 or focusing coils 66 and 88 to affect the positioning of the objective lens 24.

When the photodetector 26 warrants a displacement of the objective lens 24, a given current is applied to either the tracking coils 76 and 78 or the focusing coils 66 and 88 depending on the direction in which the displacement is required. This current induces an electromagnetic field which interacts with the magnetization of the permanent magnets 100 and 102 and displaces the objective lens holder 45 in either the tracking direction or the focusing direction. Since the objective lens 24 is attached to the objective lens holder 45, movement of the objective lens holder 45 results in a similar displacement of the accompanying objective lens 24.

Figure 7:
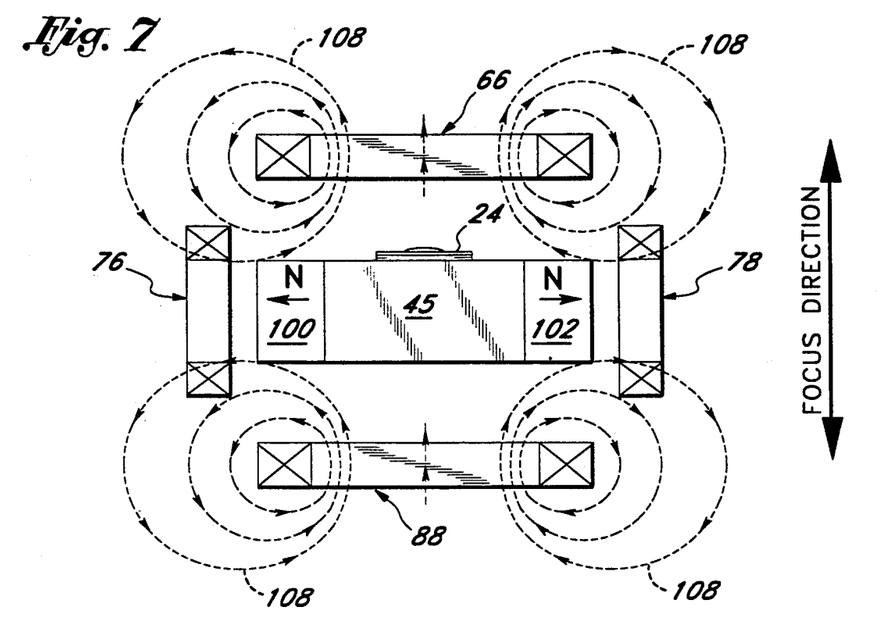
FIG. 7 illustrates the electromagnetic field employed for focusing the objective lens on the information medium.

For example, if re-positioning is desired in the focusing direction, according to a focus error signal, this signal is transmitted to a servo amplifier (not shown), which generates a current to induce an electromagnetic field 108 in each of the focus coils 66 and 88. As illustrated in FIG. 7, this electromagnetic field 108 differs in direction for the respective focusing coils 66 and 88. In the example shown, both magnets 100 and 102 will be attracted by focus coil 88 and repelled by focus coil 66, thus moving the objective lens holder 45 toward coil 88 and away from coil 66, the magnitude of this displacement being proportional to the strength of the induced electromagnetic field 108.

Figure 8:
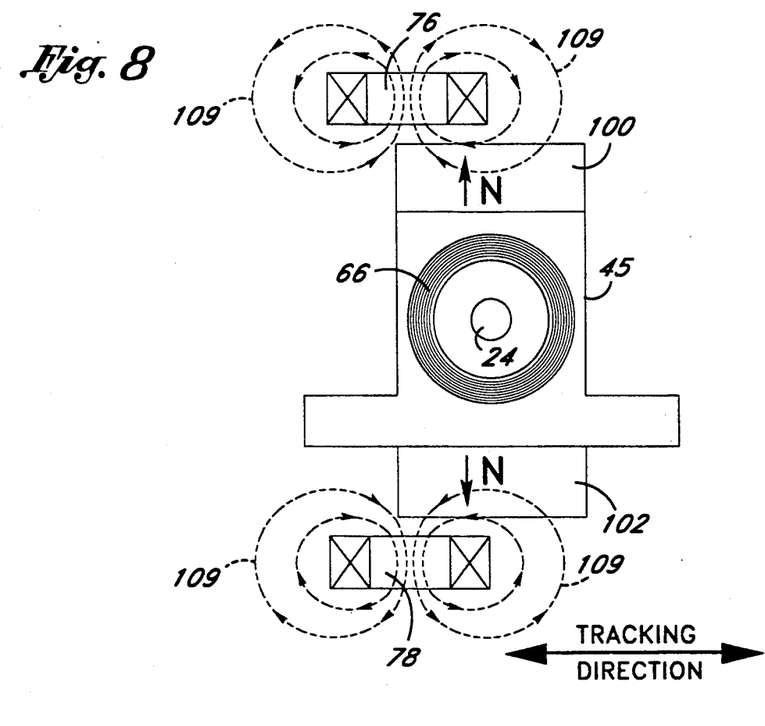
FIG. 8 illustrates the electromagnetic field employed for tracking the objective lens over a desired location on the information medium.

In a similar manner, FIG. 8 illustrates two permanent magnets 100 and 102 being attracted to tracking coils 76 and 78. As the tracking coils are offset from the center of the base 42, energization of the tracking coils 76 and 78 moves the lens holder 45 in the tracking direction toward or away from the tracking coils 76 and 78. In particular, in the presence of this exemplary electromagnetic field 109, magnet 100 is attracted by tracking coil 76 and magnet 102 will be attracted by tracking coil 78, thereby moving the objective lens holder 45 toward coil 78 and coil 76.

Figure 5:
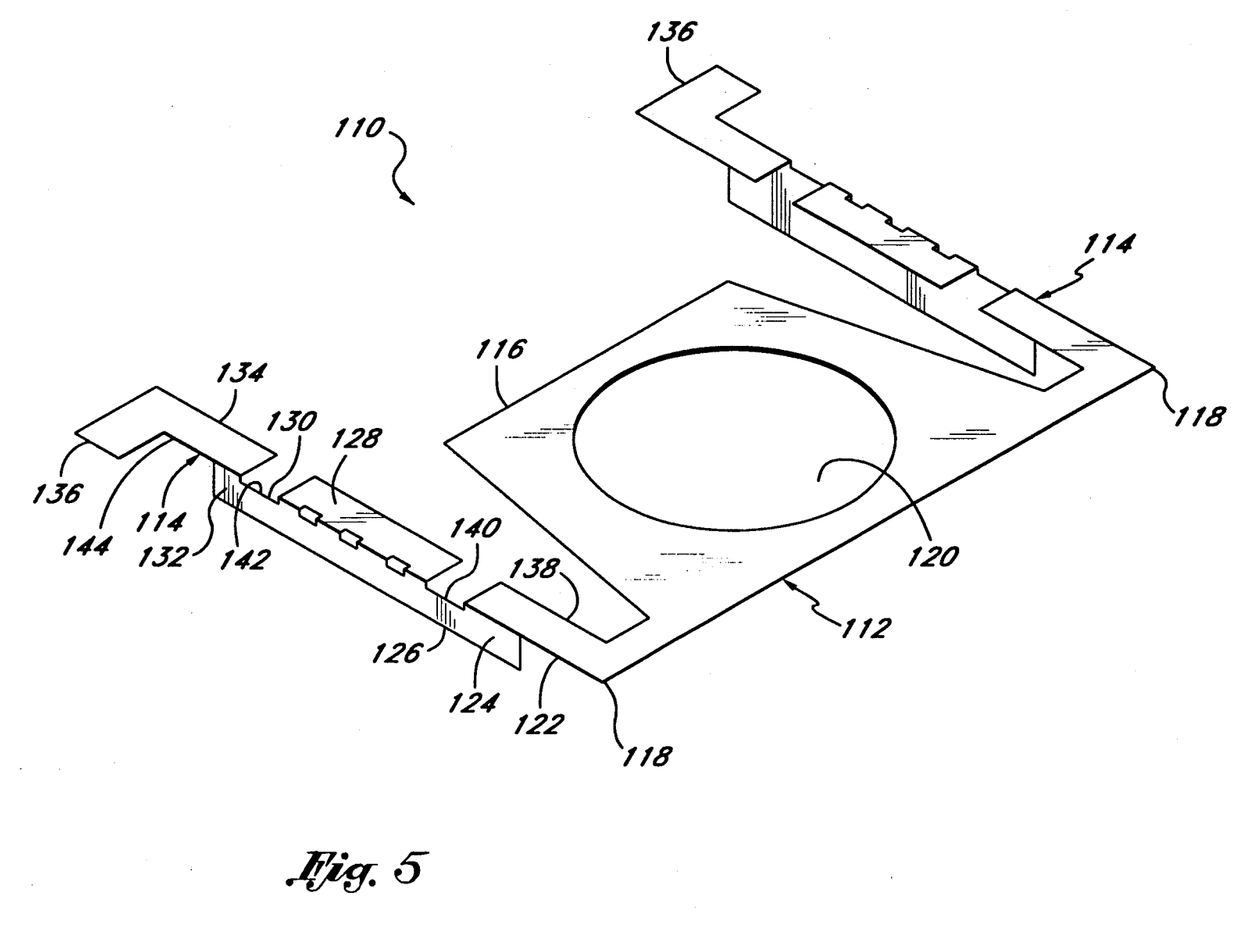
FIG. 5 is an enlarged view of a flexure of this invention.

As best seen in FIG. 3, the objective lens holder 45 is secured in a suspended manner within the base 42 by means of the upper and lower flexures, 41 and 43, which, in turn, are mounted on the base 42. Desirably, these flexures 41 and 43 consist of a thin sheet of etched or stamped metal (typically steel or beryllium copper) with a thickness in the order of 25 micrometers to 75 micrometers. Referring now to FIG. 5, the flexures will now be described in greater detail. For simplicity, we will only refer to the upper flexure 41, the bottom flexure 43 desirably having an identical configuration. The flexure 41 is generally U-shaped, with an open end 110 and a closed end 112. The open end 110 is formed by the distal ends of a pair of arms 114, and the closed end 112 is formed by an inner trapezoidal projection 116 extending between the arms 114 and a pair of outer shoulders 118 connecting the arms 114 to the projection 116. The arms 114 each form a ninety-five degree angle with the outer edge of the trapezoidal projection 116, so that the arms 114 form a ten degree angle with one another. The projection 116 includes a large central opening 120 and is formed by a horizontal sheet, as are the outer shoulders 118. While portions of the arms 114 are horizontal and coplanar with the trapezoidal projection 116, other portions are vertical and perpendicular to the trapezoidal projection 116, while others are L-shaped, including both a horizontal and a vertical leg. These portions of the arms cooperate to form a number of discrete hinges, which will now be described in detail.

Progressing outward from the shoulder 118 of the flexure 41 to the distal end of the arm 114 (i.e., toward the open end 110 of the flexure), the arm 114 is formed by a first horizontal section 122, a first L-shaped beam section 124, a first vertical section 126, a second L-shaped beam section 128, a second vertical section 130, a third L-shaped beam section 132 and a second horizontal section 134. Although it will be appreciated by those of skill in the art that the beam sections need not be L-shaped to fulfill their role in the support system, it is believed that the L-shape is the optimum shape both from the standpoint of enabling the beam sections to resist the forces exerted on them and from the standpoint of material and manufacturing costs. The distal end of this second horizontal section forms a foot 136, which is secured to the base 42 for mounting the flexure 41. As will be appreciated, the horizontal sections 122 and 134 provide very little resistance to bending about a horizontal axis (i.e., up and down), while providing substantially greater resistance to bending about a vertical axis (i.e., side to side). Likewise, the vertical sections 126, 130 provide very little resistance to bending about a vertical axis (i.e., side to side), while providing substantially greater resistance to bending about a horizontal axis (i.e., up and down). Further, the beam sections 124, 128, 132 provide relatively great resistance to bending about either a vertical or a horizontal axis.

Alternatively, the arms of the flexures could be manufactured by sandwiching a layer of viscoelastic material between two layers of metal. A suitable metal would be steel. Areas of increased stiffness can then be formed by bending a portion of said arm to form areas of increased stiffness. Sometimes it may be desirable to bend only one of the metal layers and the layer of viscoelastic material or one of the layers of metal alone to create the areas of increased stiffness.

As a result of these varying levels of resistance to bending, a number of discrete hinges are formed. Specifically, an inner focusing hinge 138 is formed between the shoulder 118 and the first beam section 124, an inner tracking hinge 140 is formed between the first beam section 124 and the second beam section 128, an outer tracking hinge 142 is formed between the second beam section 128 and the third beam section 132, and an outer focusing hinge 144 is formed between the third beam section 132 and the distal end of the arm 114. This configuration is an important aspect of the invention in that, as a result of this configuration the flexures 41, 43 permit the controlled movement of the lens holder 45 in the focusing direction (up and down) and the tracking direction (side to side), while restricting the movement of the lens holder 45 in the remaining four modes of movement.

The second beam section 128, being longer than the first or third beam sections 124, 132 forms a control beam section, which provides overall rigidity and which separates the inner and outer tracking hinges and focusing hinges from one another. The tracking hinges are located adjacent to and outward from the second beam section 128. The focusing hinges are located outward from both the second beam section and the first and third beam sections and with the inner focusing hinge being adjacent to the first beam section and the outer focusing hinge being adjacent to the third beam section. The first and third beam sections 124 and 132, respectively, positioned as they are between the tracking and focusing hinges, form spacing beam sections, isolating the movements of the hinges from one another. It will be readily appreciated by those in the art that the upper and lower flexure need not be of identical configuration as the light beam is only reflected through the upper flexure 41. On the other hand, having the flexure be of an identical configuration is desirable both for standardization and inventory purposes. Likewise, although the support system of the present invention desirably incorporates a pair of flexures, it will be apparent to those skilled in the art that the system could utilize four separate legs. That is, instead of utilizing the upper flexure including two legs 114 joined by the inner trapezoidal projection 116, the system could utilize two unjoined legs separately secured at one end to the objective lens holder 45 and at the opposite end to the base 42. Likewise, the lower flexure 43 could be replaced by two unjoined legs similarly secured to the holder 45 and the base 42.

Referring again to FIG. 3, the upper flexure 41 is attached to the top 60 of lens holder 45 and the lower flexure 43 is attached to the bottom 62 of the lens holder 45. The feet 136 of each flexure are secured to the base, thereby suspending the lens holder 45 within the hollow interior of the base 42. The central opening 120 of the flexures 41, 43 correspond in size to and are aligned with the apertures, 48 and 50, respectively, of the holder 45 so as to permit the unobstructed passage of light therethrough. Centered over the central opening 120 of the upper flexure 41, resting upon the inner trapezoidal projection 116 is an objective lens 24 which is used for focusing the light beam on and receiving the light beam from the information medium 14. A ring-shaped mass balance 150 is centered below the central opening 120 of the lower flexure 43 and secured to the inner trapezoidal projection thereof, as a system counterweight to counterbalance the lens 24 and ensure that electromagnetic forces are applied to the center of gravity and that rotational forces on the lens holder 45 are eliminated during re-positioning in the tracking direction. The lower-most element of the actuator 38 is the lower focus coil 88.

Referring now to FIG. 6, the manner in which the flexures cooperate to provide focus and tracking motion of the lens while constraining the four remaining degrees of freedom will now be described in greater detail. FIG. 6 illustrates the upper and lower flexure, 41 and 43, secured to the top and bottom, 60 and 62, respectively, of the lens holder 45. Also shown are permanent magnets 100 and 102 secured to the ends 104 and 69, respectively, of the lens holder. For clarity neither the feet of the flexures nor the rigid base connections to which the feet of the flexures are secured are shown. It should be understood that the open or distal end 110 of each flexure is restrained to move in conjunction with the base 42. However, for purposes of the fine positioning components of the actuator 38, the distal end 110 of the flexures, 41 and 43, can be considered to be fixed.

Figure 6A:
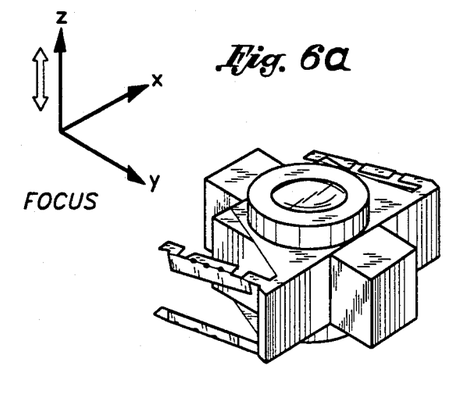
FIGS. 6a through 6f illustrate schematically an objective lens undergoing movement relative to the accompanying support system in each of the six available modes.

Referring now to the schematic identified as "Focus", the support system permits the movement of the lens holder 45 along the Z axis, which is parallel to the axis of the objective lens 24. Specifically, as discussed above, the fine focusing movement of the objective lens 24 results from the magnetic forces created by applying current to the focusing coils 66 and 88, which interacts with the magnetization of the permanent magnets 100 and 102. This in turn creates a force parallel to the Z axis which in turn generates a moment about the X axis, which would ordinarily introduce roll, making it more difficult to precisely focus the objective lens 24. However, due to the unique structural configuration of the support system, this movement occurs, almost solely, about the inner and outer focusing hinges, 138 and 144, of the flexures 41,43.

When the magnetic forces move the objective lens 24 in the direction of the Z axis, bending moments are applied to each arm 114. The shoulder 118 of each arm of the flexures is rigidly secured to the flange 70 of the lens holder 45, reinforcing this section of the flexure. Likewise, the foot 136 of each section of the flexures is rigidly secured to the base 42, reinforcing this section of the flexure. The first, second and third beam sections 124, 128 and 132 of the flexure are more rigid than the other sections of the flexure due to the additional working of the metal at the juncture of their two legs. Additionally, the beam sections, like the first and second vertical sections 126, 130 are much more resistant to these bending moments than the first and second horizontal sections 122, 134, due to their much greater thickness in a direction parallel to the Z axis. Since each arm 114 is provided with two horizontal sections, rather than only one, each arm forms an inner focusing hinge 138 proximate the closed end 112 of its respective flexure and an outer focusing hinge 144 proximate the open end of its flexure.

These two focusing hinges 138,144 cooperate to prevent the rotation of the objective lens 24 about the X axis. For example, as upward magnetic forces act on the objective lens 24, the third beam section 132 begins to rotate upward relative the foot 136 about the outer focusing hinge 144. Soon, however, this is counteracted by the downward rotation of the first beam section 124 relative the shoulder 118 about the inner focusing hinge 138. As a result, the axis of the objective lens 24 remains almost vertical (parallel to the Z axis).

Figure 6B:
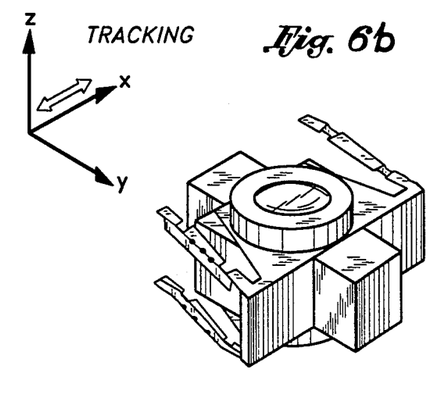

Referring now to the schematic identified as "Tracking", the support system permits the movement of the lens holder 45 along the X axis, which is perpendicular to the axis of the objective lens 24, for purposes of fine tuning the position of the focused beam on the desired track. Specifically, as discussed above, the fine tracking movement of the objective lens 24 results from the magnetic forces created by applying current to the tracking coils 76 and 78, which interact with the magnetization of the permanent magnets 100 and 102. This in turn creates a force parallel to the X axis which in turn generates a moment about the Z axis, which would ordinarily introduce yaw, making it more difficult to precisely focus the objective lens. However, due to the unique structural configuration of the support system, this movement occurs, almost solely, about the inner and outer tracking hinges 140, 142 of the flexures 41,43.

When the magnetic forces move the objective lens 24 in the direction of the X axis, bending moments are applied to each arm. The shoulder 118 of each arm 114 of the flexures is rigidly secured to the flange 70 of the lens holder, reinforcing this section of the flexure. Likewise, the foot 136 of each section of the flexures is rigidly secured to the base 42, reinforcing this section of the flexure. The first, second and third beam sections 124, 128, 132 of each arm 114 are more rigid than the other sections of the arm 114 due to the additional working of the metal at the juncture of their two legs. Additionally, the beam sections 124, 128, 132, as well as the first and second horizontal sections 122, 134 are much more resistant to these bending moments than the first and second vertical sections 126, 130, due to their much greater thickness in a direction parallel to the X axis. Since each arm 114 is provided with two vertical sections, rather than only one, each arm forms an inner tracking hinge 140 proximate the closed end 112 of its respective flexure and an outer tracking hinge 142 proximate the open end 110 of its flexure.

These two tracking hinges 140, 142 cooperate to prevent the rotation of the objective lens 24 about the Z axis. For example, as horizontal magnetic forces in the minus X direction act on the objective lens, the second beam section 128 begins to rotate in the minus X direction relative the third beam section 132 about the outer tracking hinge 142. Soon, however, this is counteracted by the rotation of the second beam section 128 in the positive X direction relative the first beam section 124 about the inner tracking hinge 140. Again, as a result, the axis of the objective lens 24 remains almost vertical.

Because the magnetic forces acting upon the support system are not always precisely along the X and Z axes, and because other forces act upon the support system in addition to those forces resulting from the magnetic fields created by the base, it is an important aspect of this invention that the support system also constrain pitch and tangential movement.

Figure 6C:
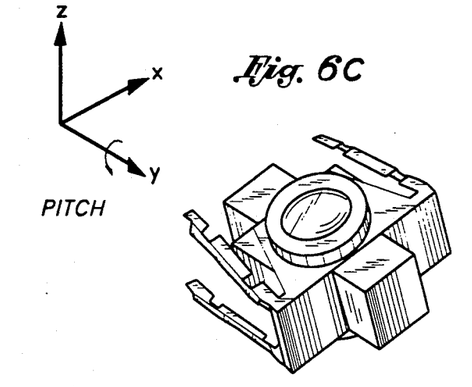
Figure 6D:
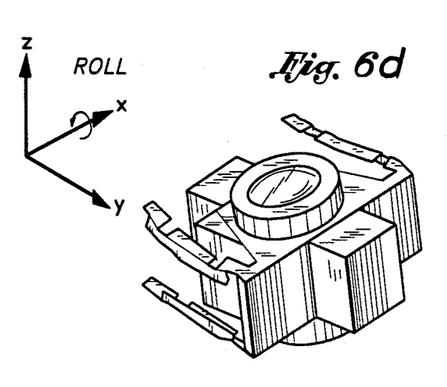

As will be appreciated from viewing the schematic labelled "Pitch," pitch results from the X component of a force displaced from the Y axis which acts on the lens holder 45. This in turn exerts a twisting moment on each of the beams sections 114 of the flexures 41, 43. However, because each of the arms 114 forms a ninety-five degree angle with the closed end of the flexure the cooperating flexures 41, 43 offer significant resistance to pitch.

It has been known in the art to increase resistance of a support system to pitch by mounting the lens holder by means of four rods secured to a frame. The increased rigidity of the system resulted from mounting the rods at a given angle to the frame and the lens holder. However, this means of mounting is undesirable in that it required that precise mechanical tolerances be maintained in order to precisely mount the rods at the proper angles. Since the flexure of the present invention can be etched or stamped and the necessary angles for resistance to pitch are incorporated in the flexures themselves rather than resulting from the way they are mounted, the present invention suffers from no such drawback.

Figure 6E:
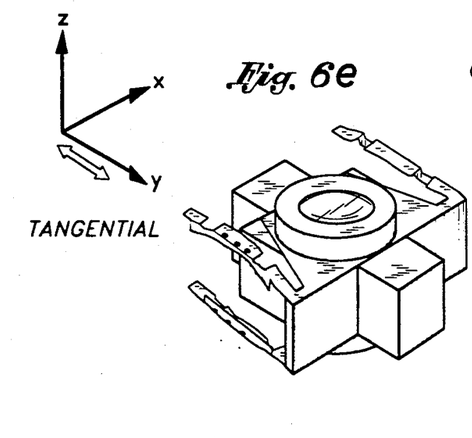
Figure 6F:
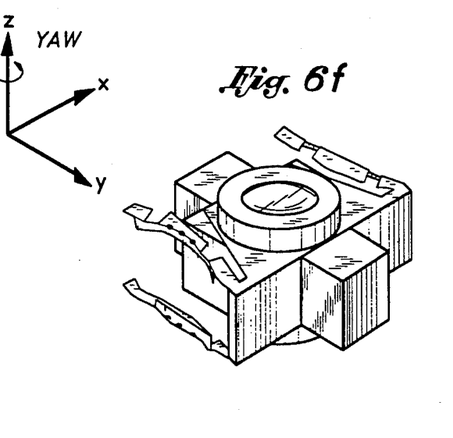

The support system likewise severely constrains movement of the lens holder 45 in the tangential direction. As will be appreciated from viewing the schematic labelled "Tangential," tangential movement results from the Y component of a force which acts on the lens holder 45. Depending upon its orientation, this force exerts tension or compression force on each of the arms 114 of the flexures. Since the majority of the length of each arm is formed by the first, second and third beam sections 124, 128, 132, it will be appreciated that the arm is extremely resistant to this tension or compression force. Although even the solely vertical and horizontal sections of the arms offer significant resistance to such force, the L-sections are obviously much more rigid in that the cooperating legs of the L-section prevent one another from buckling. Again, not only is the majority of the length of the arm beam, but the length of the arm which is solely vertical or horizontal at any one location is reduced by separating the area into two separate sections of the arm separated from one another by at least one beam section.

Thus, there is provided an improved support system which permits the precise focus and tracking of laser light. Although the invention has been described, for purposes of illustration, in connection with a preferred embodiment, it will be apparent to those of skill in the are that many changes and modifications can be made to the device without departing from the spirit and scope of the invention.

What is claimed is:

1. A support system for an optical lens having an optical axis, comprising:
    a base;
    a holder having a top and a bottom, within which said lens is rigidly mounted, said top defining an aperture through which light may pass;
    a first generally U-shaped flexure having an open end and a closed end, said closed end being secured to said top of said holder and including a projection which defines an opening aligned with said aperture having a size and shape which permits the essentially unobstructed passage of light from said aperture, said open end including a pair of arms the distal ends of which are secured to said base; and
    a second generally U-shaped flexure having an open end and a closed end, said closed end being secured to said bottom of said holder, said open end including a pair of arms the distal ends of which are secured to said base at a location offset from said first flexure, each of said arms of said first flexure and said second flexure comprising:
        a control beam section, wherein said control beam section is formed by bending a portion of said arm into an L-shape to form an area of increased stiffness;
        a pair of tracking hinges, one of which is located outward from each end of said control beam section, each of said tracking hinges permitting said arm to bend about an axis parallel to said optical axis of said lens;
        a pair of focusing hinges, one of which is located outward from each end of said control beam section, each of said focusing hinges permitting said arm to bend about an axis perpendicular to said optical axis of said lens; and
        a pair of spacing beam sections, one of which is located outward from each end of said control beam between one of said tracking hinges and one of said focusing hinges, wherein said beam sections provide the stiffness to impede unwanted motion of said lens, wherein each of said spacing beam sections is formed by bending a portion of said arm into an L-shape to form an area of increased stiffness.

2. The support system of claim 1, wherein the stiffness of said beam sections is independently adjustable to achieve the most opportune flexibility of said tracking and focusing hinge pairs.

3. The support system of claim 2, wherein the stiffness of said beam sections is independently adjustable to achieve the most opportune flexibility of said tracking and focusing hinge pairs.

4. The support system of claim 3, wherein said tracking hinges are formed as a flat length of said flexure arm lying in a plane which is parallel to said optical ais of said lens.

5. The support system of claim 1, wherein said focusing hinges are located outward from said tracking hinges.

6. A pair of cooperating flexures for supporting an optical lens having an optical axis, comprising:
    a first generally U-shaped flexure having an open end and a closed end, said open end including a pair of arms; and
    a second generally U-shaped flexure having an open end and a closed end, said open end including a pair of arms, said closed ends of said flexures cooperating to hold said lens therebetween, each of said arms of said first flexure and said second flexure comprising:
        control beam section, wherein said control beam section is formed by bending a portion of said arm to form a pair of legs having an angle with respect to one another;
        a pair of tracking hinges, one of which is located outward from each end of said control beam section, each of said tracking hinges permitting said arm to bend about an axis parallel to said optical axis of said lens;

a pair of focusing hinges, one of which is located outward from each end of said control beam section, each of said focusing hinges permitting said arm to bend about an axis perpendicular to said optical axis of said lens; and a pair of spacing beam sections, one of which is located outward from each end of said control beam between one of said tracking hinges and one of said focusing hinges, wherein said beam sections provide the stiffness to impede unwanted motion of said lens, wherein each of said spacing beam sections is formed by bending a portion of said arm to form a pair of legs having an angle with respect to one another.

7. The pair of cooperating flexures of claim 6, wherein the stiffness of said beam sections is independently adjustable to achieve the most opportune flexibility of said tracking and focusing hinge pairs.

8. The pair of cooperating flexures of claim 7, wherein said focusing hinges are formed as a flat length of said flexure arm lying in a plane which is perpendicular to the optical axis of said lens.

9. The pair of cooperating flexures of claim 8, wherein said tracking hinges are formed as a flat length of said flexure arm lying in a plane which is parallel to the optical axis of said lens.

10. The pair of cooperating flexures of claim 6, wherein said focusing hinges are located outward from said tracking hinges.

11. The pair of cooperating flexures of claim 6, wherein said flexures consist of thin sheets of etched or stamped metal of uniform thickness.

12. The pair of cooperating flexures of claim 11, wherein said flexures include flat sections in the same plane as the focusing hinges for interfacing to a lens holder and base.

13. The pair of cooperating flexures of claim 6, wherein said flexures are formed from a single piece of flat material.

14. The pair of cooperating flexures of claim 13, wherein each of said pairs of arms forms a ninety-five degree angle with said closed end of one of said flexures.

15. A support system for an optical lens having an optical axis, comprising:

a base;

a holder having a top and a bottom, within which said lens is rigidly mounted, said top defining an aperture through which light may pass;

a first pair of arms having a first end and a second end, said first end of each of said first pair of arms being secured to said top of said holder and said second end of each of said pair of arms being secured to said base; and a second pair of arms having a first end and a second end, said first end of each of said first pair of arms being secured to said holder at a location offset from said first pair of arms and said second end of each of said first pair of arms being of which are secured to said base at a location off set from said first pair of arms, each of said arms of said first pair of arms and said second pair of arms comprising:

control beam section, wherein said control beam section is formed by bending a portion of said arm into an L-shape to form an area of increased stiffness;

a pair of tracking hinges, one of which is located outward from each end of said control beam section, each of said tracking hinges permitting said arm to bend about an axis parallel to said optical axis of said lens;

a pair of focusing hinges, one of which is located outward from each end of said control beam section, each of said focusing hinges permitting said arm to bend about an axis perpendicular to said optical axis of said lens; and a pair of spacing beam sections, one of which is located outward from each end of said control beam between one of said tracking hinges and one of said focusing hinges, wherein said beam sections provide the stiffness to impede unwanted motion of said lens, wherein each of said spacing beam sections is formed by bending a portion of said arm into an L-shape to form an area of increased stiffness.

16. The support system of claim 15, wherein at least one of said arms comprises a layer of viscoelastic material sandwiched between two layers of metal.

17. The support system of claim 16 wherein only one layer of said arm is bent to form areas of increased stiffness.

18. The pair of cooperating flexures of claim 6, wherein said flexures consist of a lamination of metal, viscoelastic material and metal.

19. The pair of cooperating flexures of claim 6, wherein said flexures consist of a suitable plastic material.

* * * * *

UNITED STATES PATENT AND TRADEMARK OFFICE
CERTIFICATE OF CORRECTION

PATENT NO. : 5,313,332
DATED : May 17, 1994
INVENTOR(S) : David Louis Schell, et al It is certified that error appears in the above-indentified patent and that said Letters Patent is hereby corrected as shown below:

Column 3, line 1, change "of set" to --offset--.

Column 4, line 30, change first and second occurrence of "bean" to --beam--.

Column 12, lines 41-44, change "wherein the stiffness of said beam sections is independently adjustable to achieve the most opportune flexibility of said tracking and focusing hinge pairs." to --wherein said focusing hinges are formed as a flat length of said flexure arm lying in a plane which is perpendicular to said optical axis of said lens.--

Column 12, line 47, change "ais" to --axis--.

Column 14, line 14, change "off set" to --offset--.

Signed and Sealed this

Eighteenth Day of October, 1994

Attest:

BRUCE LEHMAN

Attesting Officer

Commissioner of Patents and Trademarks